United States Patent [19]

Weidemann

[11] Patent Number: 4,786,450
[45] Date of Patent: Nov. 22, 1988

[54] METHOD FOR THE PRODUCTION OF BUILDING ELEMENTS PARTICULARLY SUITED FOR USE AS BRICK FACINGS

[75] Inventor: Jorn U. Weidemann, Rudkobing, Denmark

[73] Assignee: L. P. Weidemann & Sonner I/S, Rudkobing, Denmark

[21] Appl. No.: 915,972

[22] PCT Filed: Jan. 10, 1986

[86] PCT No.: PCT/DK86/00004
  § 371 Date: Oct. 31, 1986
  § 102(e) Date: Oct. 31, 1986

[87] PCT Pub. No.: WO86/04013
  PCT Pub. Date: Jul. 17, 1986

[30] Foreign Application Priority Data

Jan. 11, 1985 [DK] Denmark ................. 160/85

[51] Int. Cl.$^4$ ............................................. C04B 40/02
[52] U.S. Cl. .................................... 264/82; 106/93;
  264/6; 264/77; 264/115; 264/118; 264/140; 264/157; 264/333
[58] Field of Search ............. 264/157, 6, 77, 118, 264/333, 140, 82, 115; 106/93, 98, 99, 101, 102

[56] References Cited

U.S. PATENT DOCUMENTS

| | | | |
|---|---|---|---|
| 1,835,158 | 12/1931 | Henderson | 264/82 |
| 2,933,766 | 4/1960 | Bickford et al. | 264/140 X |
| 3,642,969 | 2/1972 | Estrada | 264/333 X |
| 3,795,721 | 3/1974 | Gilbert et al. | 264/82 X |
| 3,919,372 | 11/1975 | Vogele | 264/157 X |
| 4,067,939 | 1/1978 | Lowe et al. | 264/333 X |
| 4,083,908 | 4/1978 | Kalvenes et al. | 264/333 X |
| 4,134,725 | 1/1979 | Büchel et al. | 264/117 X |
| 4,224,274 | 9/1980 | Ozawa | 264/333 |
| 4,300,324 | 11/1981 | Koeppel | 264/46.4 X |
| 4,518,398 | 5/1985 | Tanaka et al. | 264/65 X |

FOREIGN PATENT DOCUMENTS

| | | |
|---|---|---|
| 0054175 | 6/1982 | European Pat. Off. . |
| 848472 | 7/1952 | Fed. Rep. of Germany . |
| 1226022 | 5/1963 | Fed. Rep. of Germany . |
| 1376994 | 12/1974 | Sweden . |

*Primary Examiner*—Jan H. Silbaugh
*Assistant Examiner*—Karen D. Kutach
*Attorney, Agent, or Firm*—Watson, Cole, Grindle & Watson

[57] ABSTRACT

Method for the production of building elements preferably brick facings by granulation of a mixture of 40-60% by weight of cement, 60-40% by weight of aggregate, 0.5-2% by weight of thickening agent such as carboxymethylcellulose and preferably coloring agent or one or more additives and water in an amount of 8-17% by weight based on the dry matter of the mixture, hot pressing the granules under a pressure of 50-100 kg/cm$^2$ and at a temperature above 100° C. to form single elements or a string, and cutting the string into single elements, and storing the elements in a humid atmosphere until a considerable setting of the cement has taken place. The method is considerably simpler and quicker than the known methods for the production of brick facings.

18 Claims, No Drawings

METHOD FOR THE PRODUCTION OF BUILDING ELEMENTS PARTICULARLY SUITED FOR USE AS BRICK FACINGS

BACKGROUND OF THE INVENTION

The invention relates to a method for the production of building elements which are particularly suited for use as brick facings.

It is well known to make brick facings from tiles and lime sand bricks. However, tile elements are difficult to produce as their production includes shaping of the units and subsequent baking. In addition to this, the shaped units may become considerably deformed during baking. Finally, the production of brick facings from tile elements presents considerable drawbacks with respect to obtaining specific and reproducible colours as the colour development to a large extent is determined by the composition of the clay used in the production. Likewise, the production of lime-sand brick facings, which requires the use of pressure vessels, is difficult and time consuming.

The object of the invention is to provide a quick method for the production of building elements of a uniform shape and reproducible appearance, and particularly building elements for use as brick facings.

SUMMARY OF THE INVENTION

This object is obtained by the method of the invention, wherein a mixture of 40–60% by weight of cement, 60–40% by weight of aggregate, 0.5–2% by weight of thickening agent, and optionally a colouring agent or one or more additives and water in an amount of 8–17% by weight based on the dry matter of the mixture is granulated, the granules are pressed under a pressure of 50–100 kg/cm$^2$ and at temperature over 100° C. to form a single element or a string which is subsequently cut into single elements, and the element or elements is (are) stored in a humid atmosphere until a considerable setting of the cement has taken place.

Previous attempts to accelerate the production of cement building elements by pressing in moulds have faced the problem that the pressed units only can be removed from the moulds with great difficulties.

According to the invention it has surprisingly been found that by using the pressure and temperature conditions mentioned above, combined with the use of a thickening agent, a steam film is formed on the surface of the pressed unit, and this steam film acts as a release agent which makes it possible to release the element from the mould.

It has been found that the building elements made according to the invention exhibits a sufficiently large stability with respect to shape and are sufficiently weather resisting to be used as brick facings on outer walls. By proper choice of colouring agent it has proved possible to obtain elements of strongly varying colours and including colours similar to those of conventional red and yellow bricks.

The building elements may not only be produced in the form of planar units but also as angular elements for use on wall corners.

The production of granules is preferably effected by mixing the solid components, i.e., cement, aggregate (preferably in the form of sand) and a thickening agent such as carboxymethylcellulose, a separating agent such as zinc stearate, and optionally a solid colouring agent. The solid mixture thus obtained is then added to the apportioned amount of water in the vessel of a mixing apparatus, and it is mixed until a viscous mass is obtained. The viscous mass thus obtained is allowed to stand for preferably about ½ hr. or more. However, this period may be reduced considerably by using a moistening agent in the mixture of cement, aggregate and water. The granulation of the viscous mass is preferably effected by means of one or more horizontally placed metal nets with a mesh size ranging from 0.5 to 2 cm and by rotating impellers moving in parallel direction with the nets and at a short distance above their top surface.

When using moulds for hot pressing of the granules, the mould parts used preferably have a surface temperature of 120°–160° C. Temperatures above about 160° C. should normally be avoided as there is a tendency at such temperature for the material to burn to the mould parts.

The pressure used is, as mentioned, 50–100 kg/cm$^2$, and preferably 75–95 kg/cm$^2$. The pressure partly depends on the water content of the granules as a low water content requires a relatively high pressure.

After placing the granules in the mould but before pressing, an upper layer of a paste containing colouring agent, cement, and water may be added. In this manner special colour effects may be produced by this in the surface of the elements.

After the hot pressing has taken place the product formed has a certain plasticity. On the one hand this plasticity is sufficiently great to allow a string to be cut into the desired pieces, and on the other hand sufficiently limited that the elements directly formed or those formed by cutting of the string have a sufficiently great strength to be handled. In order to accomplish the step of storing the elements in a humid atmosphere, the elements can be immediately packed in plastic bags and (preferably) kept at room temperature for about one week. The plastic bags present the advantage of securing the maintenance of a proper moisture content during the continuing setting of the cement.

After such storing they are sufficiently strong to be transported to the building site and used.

Even though the elements formed by the method of the invention have a great mechanical strength, it may in some cases be desirable to increase the strength by incorporating reinforcement fibres into the mixture of starting materials. Such fibres may be of inorganic and-/or organic origin.

The invention will now be further described with reference to the following:

EXAMPLE

A mixture was produced containing:

| | |
|---|---|
| Rapid cement | 50.0 kg |
| Sand | 50.0 kg |
| Carboxymethylcellulose | 0.7 kg |
| Yellow iron oxide | 2.5 kg |
| | 103.20 kg |

This mixture was added to the mixing tank of a conventional mixing apparatus containing 13.5 kg water and was stirred until a uniform, viscous mass was obtained. The product formed was allowed to stand for ½ hr. and was then granulated by being pressed through a metal net with a mesh size of 1 cm by means of rotating impellers moving in a path close to and parallel with the net.

The granules were introduced into a mould of the dimensions 5.4×22.8 cm in an amount of 200 g. The material was subsequently pressed together to a thickness of 0.7 cm by means of heated mould parts with a surface temperature of 135° C. and under a pressure of 85.5 kg/cm².

The pressure was maintained for a period of about 0.4 sec.

The pressed unit formed was then released from the mould, and was immediately packed in a plastic bag. The packed pressed units were then stored for about 1 week at room temperature.

Elements produced as described above were used as brick facings on a hard sheet of rock wool fibres forming the outside of an outer wall. This resulted in a wall which was difficult to distinguish from a normal wall of conventional yellow bricks in terms of appearance.

After having been exposed to the influence of the weather for a period of 4½ months the wall showed no signs of deterioration or change in the brick facings.

I claim:

1. A method for producing a building element suitable for use as a brick facing, said method comprising the steps of
    (a) forming a mixture of 40-60% by weight of cement, 40-60% by weight of aggregate, 0.5-2% by weight of thickening agent, and water; said cement, aggregate and thickening agent being dry materials and said water being present in an amount of 8-17% by weight, based on the weight of said dry materials,
    (b) granulating said mixture formed in step (a),
    (c) pressing said granulated mixture from step (b) at a pressure of 50-100 kg/cm² and at a temperature of more than 100° C. in a mold to form a solid intermediate product with a steam film on its surface which acts as a release agent, and
    (d) releasing said solid intermediate product from said mold and subjecting it to a humid atmosphere until said cement component therein has partially set, thereby providing said building element.

2. A method according to claim 1, wherein said aggregate is sand.

3. A method according to claim 1, wherein said thickening agent is carboxymethylcellulose.

4. A method according to claim 1, wherein in step (c) said granulated mixture from step (b) is hot pressed between mold parts whose surface temperature is 120°-160° C.

5. A method according to claim 1, wherein in step (c) said pressure is 75-95 kg/cm².

6. A method according to claim 1, wherein in step (d) said solid intermediate product is packed in a plastic bag, and said plastic bag is stored at room temperature.

7. A method according to claim 1, wherein said mixture formed in step (a) also includes reinforcing fibers.

8. A method according to claim 1, wherein in step (b) said mixture formed in step (a) is passed through at least one horizontal metal net whose mesh size is 0.5 to 2 cm.

9. A method according to claim 1, wherein said mixture formed in step (a) also includes a colouring agent.

10. A method according to claim 9, wherein said colouring agent is yellow iron oxide.

11. A method for producing a plurality of building elements suitable for use as a brick facing, said method comprising the steps of
    (a) forming a mixture of 40-60% by weight of cement, 40-60% by weight of aggregate, 0.5-2% by weight of thickening agent, and water; said cement, aggregate and thickening agent being dry materials and said water being present in an amount of 8-17% by weight, based on the weight of said dry materials,
    (b) granulating said mixture formed in step (a),
    (c) pressing said granulated mixture from step (b) at a pressure of 50-100 kg/cm² and at a temperature of more than 100° C. in a mold to form a first solid intermediate product with a steam film on its surface which acts as a release agent,
    (d) releasing said first solid intermediate product from said mold and cutting into a plurality of second solid intermediate products, and
    (e) subjecting each of said plurality of second solid intermediate products to a humid atmosphere until said cement component therein has partially set, thereby providing said plurality of building elements.

12. A method according to claim 11, wherein said aggregate is sand.

13. A method according to claim 11, wherein said thickening agent is carboxymethylcellulose.

14. A method according to claim 11, wherein in step (e) said second solid intermediate products are packed in plastic bags, and said plastic bags are stored at room temperature.

15. A method according to claim 11, wherein said mixture formed in step (a) also includes reinforcing fibers.

16. A method according to claim 11, wherein in step (b) said mixture formed in step (a) is passed through at least one horizontal metal net whose mesh size is 0.5 to 2 cm.

17. A method according to claim 11, wherein said mixture formed in step (a) also includes a colouring agent.

18. A method according to claim 17, wherein said colouring agent is yellow iron oxide.

* * * * *